US012587336B2

(12) United States Patent
Tao et al.

(10) Patent No.: US 12,587,336 B2
(45) Date of Patent: Mar. 24, 2026

(54) TRANSMIT BEAFORMING FOR POSITIONING

(71) Applicant: Nokia Technologies Oy, Espoo (FI)

(72) Inventors: Tao Tao, Shanghai (CN); Ryan Keating, Naperville, IL (US); Yan Meng, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 308 days.

(21) Appl. No.: 18/552,804

(22) PCT Filed: Mar. 29, 2021

(86) PCT No.: PCT/CN2021/083479
§ 371 (c)(1),
(2) Date: Sep. 27, 2023

(87) PCT Pub. No.: WO2022/204842
PCT Pub. Date: Oct. 6, 2022

(65) Prior Publication Data
US 2024/0195563 A1      Jun. 13, 2024

(51) Int. Cl.
*H04L 5/00* (2006.01)
*G01S 5/00* (2006.01)
*H04W 64/00* (2009.01)

(52) U.S. Cl.
CPC ............ *H04L 5/005* (2013.01); *G01S 5/0027* (2013.01); *H04W 64/00* (2013.01)

(58) Field of Classification Search
CPC ..... H04L 5/005; G01S 5/0027; G09B 29/007; H04W 64/00
See application file for complete search history.

(56) References Cited

U.S. PATENT DOCUMENTS

2019/0369201 A1     12/2019     Akkarakaran et al.
2020/0145977 A1      5/2020     Kumar et al.
(Continued)

FOREIGN PATENT DOCUMENTS

CN        110536234 A      12/2019
CN        111132307 A       5/2020
(Continued)

OTHER PUBLICATIONS

"3rd Generation Partnership Project; Technical Specification Group Radio Access Network; NG-RAN; NR Positioning Protocol A (NRPPa) (Release 16)", 3GPP TS 38.455, V16.2.0, Jan. 2021, pp. 1-151.

(Continued)

*Primary Examiner* — Curtis B Odom
(74) *Attorney, Agent, or Firm* — Nokia Technologies Oy

(57) ABSTRACT

Embodiments of the present disclosure relate to a transmit beamforming for positioning. A location management device generates information regarding an angle of departure, the angle of departure being expected for transmission of reference signals for positioning and transmits the information to a device transmitting the reference signals. The device may determine a transmit beamforming solution for transmitting the reference signals based on the angle of departure. In this way, power savings can be achieved due to decreased reference signal overhead. Further, positioning accuracy can be improved through appropriately beam-formed reference signal transmissions.

18 Claims, 9 Drawing Sheets

900

910
RECEIVE, FROM A LOCATION MANAGEMENT DEVICE, INFORMATION REGARDING A FIRST ANGLE OF DEPARTURE, THE FIRST ANGLE OF DEPARTURE BEING EXPECTED FOR TRANSMISSION OF FIRST REFERENCE SIGNALS FOR A POSITIONING OF A SECOND DEVICE

920
DETERMINE, BASED ON THE INFORMATION, A CONFIGURATION FOR THE TRANSMISSION OF THE FIRST REFERENCE SIGNALS

930
TRANSMIT THE CONFIGURATION TO THE SECOND DEVICE

(56)        References Cited

U.S. PATENT DOCUMENTS

| | | | |
|---|---|---|---|
| 2020/0187146 A1 | 6/2020 | Stirling-Gallacher et al. | |
| 2020/0267026 A1 | 8/2020 | Manolakos et al. | |
| 2021/0041522 A1 | 2/2021 | Manolakos et al. | |
| 2021/0048500 A1 | 2/2021 | Manolakos et al. | |
| 2023/0319772 A1* | 10/2023 | Alawieh | H04W 16/28 |
| | | | 455/456.1 |

FOREIGN PATENT DOCUMENTS

| | | |
|---|---|---|
| CN | 111314952 A | 6/2020 |
| CN | 111586736 A | 8/2020 |
| CN | 111756494 A | 10/2020 |
| WO | 2016/163600 A1 | 10/2016 |
| WO | 2020/164334 A1 | 8/2020 |
| WO | 2020/164345 A1 | 8/2020 |
| WO | 2020/164514 A1 | 8/2020 |
| WO | 2020/164710 A1 | 8/2020 |
| WO | 2020/167023 A1 | 8/2020 |
| WO | 2020/190607 A2 | 9/2020 |
| WO | 2021/022952 A1 | 2/2021 |
| WO | 2021/159407 A1 | 8/2021 |

OTHER PUBLICATIONS

"3rd Generation Partnership Project; Technical Specification Group Radio Access Network; LTE Positioning Protocol (LPP) (Release 16)", 3GPP TS 37.355, V16.3.0, Dec. 2020, pp. 1-298.

"3rd Generation Partnership Project; Technical Specification Group Radio Access Network; NR; Physical layer procedures for data (Release 16)", 3GPP TS 38.214, V16.4.0, Dec. 2020, pp. 1-169.

"Msc-generator", Sourceforge, Retrieved on Jan. 3, 2024, Webpage available at : https://sourceforge.net/projects/msc-generator/.

"FL Summary for Potential Positioning Enhancements", 3GPP TSG RAN WG1 Meeting #103-e, R1-2009314, Agenda: 8.5.3, CATT, Oct. 26-Nov. 13, 2020, 60 pages.

International Search Report and Written Opinion received for corresponding Patent Cooperation Treaty Application No. PCT/CN2021/083479, dated Dec. 30, 2021, 9 pages.

Examiner's Tentative Rejection received for corresponding Taiwan Patent Application No. 111109049, dated Apr. 21, 2023, 41 pages of office action and 16 page of translation available.

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.3.0, Dec. 2020, pp. 1-118.

"Views on enhancing UL AoA", 3GPP TSG RAN WG1 #104-bis-e, R1-2103003 , Agenda: 8.5.2, Nokia, 2021, 8 pages.

Partial European Search Report received for corresponding European Patent Application No. 21933529.6, dated Jan. 31, 2025, 18 pages.

"DL and UL Reference Signals for NR Positioning", 3GPP TSG RAN WG1 #96bis, R1-1905346, Agenda: 7.2.10.1, CATT, Apr. 8-12, 2019, 27 pages.

Office action received for corresponding Indian Patent Application No. 202347072314, dated Mar. 10, 2025, 6 pages.

Extended European Search Report received for corresponding European Patent Application No. 21933529.6, dated Apr. 24, 2025, 18 pages.

* cited by examiner

100

200A

200B

110

130

120

300

303

301

130

304

302

120

310

320

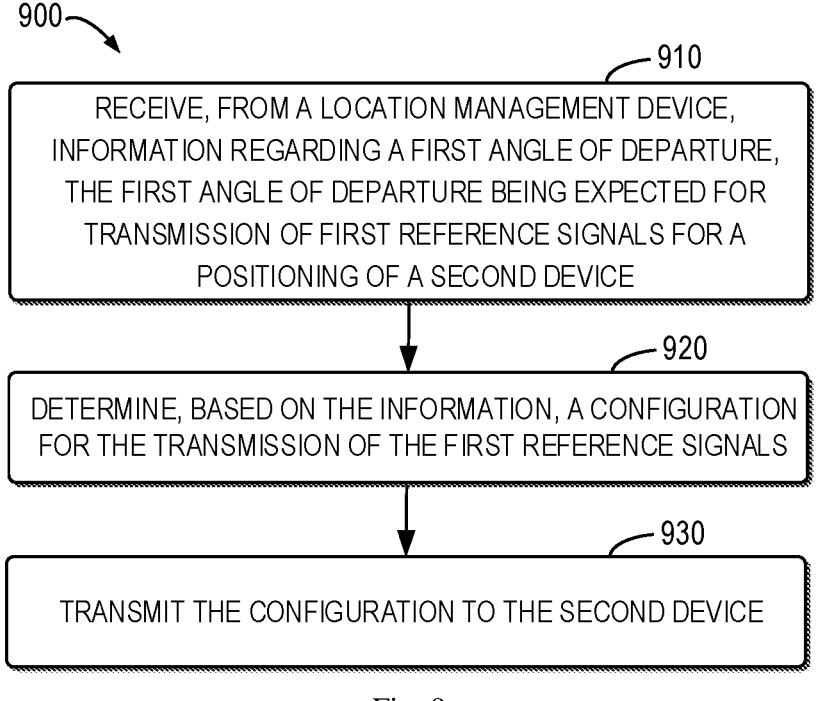

900

910
RECEIVE, FROM A LOCATION MANAGEMENT DEVICE, INFORMATION REGARDING A FIRST ANGLE OF DEPARTURE, THE FIRST ANGLE OF DEPARTURE BEING EXPECTED FOR TRANSMISSION OF FIRST REFERENCE SIGNALS FOR A POSITIONING OF A SECOND DEVICE

920
DETERMINE, BASED ON THE INFORMATION, A CONFIGURATION FOR THE TRANSMISSION OF THE FIRST REFERENCE SIGNALS

930
TRANSMIT THE CONFIGURATION TO THE SECOND DEVICE

Fig. 9

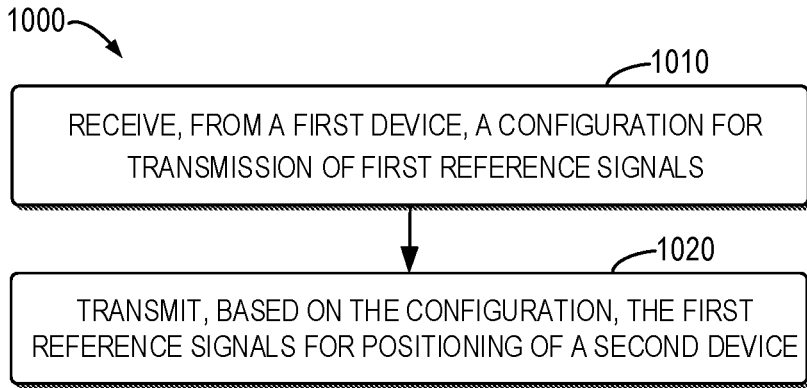

1000

1010
RECEIVE, FROM A FIRST DEVICE, A CONFIGURATION FOR TRANSMISSION OF FIRST REFERENCE SIGNALS

1020
TRANSMIT, BASED ON THE CONFIGURATION, THE FIRST REFERENCE SIGNALS FOR POSITIONING OF A SECOND DEVICE

TRANSMIT BEAFORMING FOR POSITIONING

RELATED APPLICATION

This application was originally filed as PCT Application No. PCT/CN2021/083479, filed on Mar. 29, 2021, of which is incorporated herein by reference in its entirety.

FIELD

Embodiments of the present disclosure generally relate to the field of telecommunication and in particular, to a transmit beamforming for positioning.

BACKGROUND

For positioning in new radio (NR), uplink (UL) beam management towards serving and neighbor cells has been discussed. Two approaches are supported for transmit (Tx) beamforming of sounding reference signal (SRS) for positioning. One approach is to configure spatial relation information to the user equipment (UE). The reference source can be a synchronization signal block (SSB), channel state information reference signal (CSI-RS) and downlink positioning reference signal (DL PRS). The other approach is to rely on beam sweeping.

For transmitting SRS towards UL positioning-only reception point (RP) which has no transmit capability, the UE is not able to be configured with spatial relation information for SRS transmission, and thus beam sweeping is the only option. Without any pre-knowledge, the UE may need to transmit SRS to all directions. Such operation leads to large resource overhead and UE power consumption for positioning purpose.

SUMMARY

In general, example embodiments of the present disclosure provide a solution for transmit beamforming for positioning.

In a first aspect, there is provided a first device. The first device comprises: at least one processor; and at least one memory including computer program codes. The at least one memory and the computer program codes are configured to, with the at least one processor, cause the first device to: receive, from a location management device, information regarding an angle of departure, the angle of departure being expected for transmission of first reference signals from a second device; determine, based on the information, a configuration for the transmission of the first reference signals; and transmit the configuration to the second device.

In a second aspect, there is provided a second device. The second device comprises: at least one processor; and at least one memory including computer program codes. The at least one memory and the computer program codes are configured to, with the at least one processor, cause the second device to: receive, from a first device, a configuration for transmission of first reference signals, the configuration being determined by the first device based on information regarding an angle of departure from a location management device, the angle of departure being expected for the transmission of the first reference signals from the second device; and transmit, based on the configuration, the first reference signals for positioning of the second device.

In a third aspect, there is provided a location management device. The location management device comprises: at least one processor; and at least one memory including computer program codes. The at least one memory and the computer program codes are configured to, with the at least one processor, cause the location management device to: generate information regarding an angle of departure, the angle of departure being expected for transmission of first reference signals from a second device; and transmit the information to a first device for positioning of the second device.

In a fourth aspect, there is provided a method of communication. The method comprises: receiving, at a first device and from a location management device, information regarding an angle of departure, the angle of departure being expected for transmission of first reference signals from a second device; determining, based on the information, a configuration for the transmission of the first reference signals; and transmitting the configuration to the second device.

In a fifth aspect, there is provided a method of communication. The method comprises: receiving, at a second device and from a first device, a configuration for transmission of first reference signals, the configuration being determined by the first device based on information regarding an angle of departure from a location management device, the angle of departure being expected for the transmission of the first reference signals from a second device; and transmitting, based on the configuration, the first reference signals for positioning of the second device.

In a sixth aspect, there is provided a method of communication. The method comprises: generating, at a location management device, information regarding an angle of departure, the angle of departure being expected for transmission of first reference signals from a second device; and transmitting the information to a first device for positioning of the second device.

In a seventh aspect, there is provided a third device. The third device comprises: at least one processor; and at least one memory including computer program codes. The at least one memory and the computer program codes are configured to, with the at least one processor, cause the third device to: receive, from a location management device, information regarding a second angle of departure, the second angle of departure being expected for transmission of third reference signals from the third device; and transmit, based on the second angle of departure, third reference signals to a second device for positioning of the second device.

In an eighth aspect, there is provided a second device. The second device comprises: at least one processor; and at least one memory including computer program codes. The at least one memory and the computer program codes are configured to, with the at least one processor, cause the second device to: receive, from a third device, third reference signals transmitted by the third device based on a second angle of departure, the second angle of departure being received from a location management device and expected for the transmission of the third reference signals; and transmit, to the location management device, measurements on the third reference signals for positioning of the second device.

In a ninth aspect, there is provided a location management device. The location management device comprises: at least one processor; and at least one memory including computer program codes. The at least one memory and the computer program codes are configured to, with the at least one processor, cause the location management device to: generate information regarding a second of departure, the second angle of departure being expected for transmission of third reference signals from a third device for positioning of a second device; and transmit the information to the third device.

In a tenth aspect, there is provided a method of communication. The method comprises: receiving, at a third device, from a location management device, information regarding a second angle of departure, the second angle of departure being expected for transmission of third reference signals from the third device; and transmitting, based on the second angle of departure, third reference signals to a second device for positioning of the second device.

In an eleventh aspect, there is provided a method of communication. The method comprises: receiving, at a second device and from a third device, third reference signals transmitted by the third device based on a second angle of departure, the second angle of departure being received from a location management device and expected for the transmission of the third reference signals; and transmitting, to the location management device, measurements on the third reference signals for positioning of the second device.

In a twelfth aspect, there is provided a method of communication. The method comprises: generating, at a location management device, information regarding a second angle of departure, the second angle of departure being expected for transmission of third reference signals from a third device for positioning of a second device; and transmitting the information to the third device.

In a thirteenth aspect, there is provided an apparatus of communication. The apparatus comprises: means for receiving, at a first device and from a location management device, information regarding an angle of departure, the angle of departure being expected for transmission of first reference signals from a second device; means for determining, based on the information, a configuration for the transmission of the first reference signals; and means for transmitting the configuration to the second device.

In a fourteenth aspect, there is provided an apparatus of communication. The apparatus comprises: means for receiving, at a second device and from a first device, a configuration for transmission of first reference signals, the configuration being determined by the first device based on information regarding an angle of departure from a location management device, the angle of departure being expected for the transmission of the first reference signals from a second device; and means for transmitting, based on the configuration, the first reference signals for positioning of the second device.

In a fifteenth aspect, there is provided an apparatus of communication. The apparatus comprises: means for generating, at a location management device, information regarding an angle of departure, the angle of departure being expected for transmission of first reference signals from a second device; and means for transmitting the information to a first device for positioning of the second device.

In a sixteenth aspect, there is provided an apparatus of communication. The apparatus comprises: means for receiving, at a third device, from a location management device, information regarding a second angle of departure, the second angle of departure being expected for transmission of third reference signals from the third device; and means for transmitting, based on the second angle of departure, third reference signals to a second device for positioning of the second device.

In a seventeenth aspect, there is provided an apparatus of communication. The apparatus comprises: means for receiving, at a second device and from a third device, third reference signals transmitted by the third device based on a second angle of departure, the second angle of departure being received from a location management device and expected for the transmission of the third reference signals; and means for transmitting, to the location management device, measurements on the third reference signals for positioning of the second device.

In an eighteenth aspect, there is provided an apparatus of communication. The apparatus comprises: means for generating, at a location management device, information regarding a second angle of departure, the second angle of departure being expected for transmission of third reference signals from a third device for positioning of a second device; and means for transmitting the information to the third device.

In a nineteenth aspect, there is provided a non-transitory computer readable medium. The non-transitory computer readable medium comprises program instructions for causing an apparatus to perform the method according to the fourth, fifth, sixth, tenth, eleventh or twelfth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 9 illustrates a flowchart of an example method of communication for UL positioning implemented at a first device according to example embodiments of the present disclosure;

FIG. 10 illustrates a flowchart of an example method of communication for UL positioning implemented at a second device according to example embodiments of the present disclosure;

Throughout the drawings, the same or similar reference numerals represent the same or similar element.

DETAILED DESCRIPTION

Figure 1:
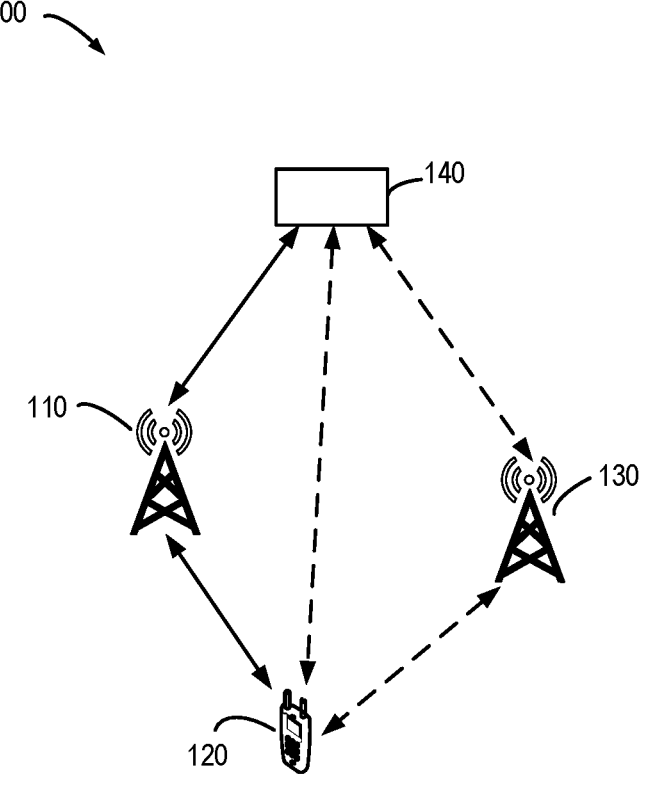
FIG. 1 illustrates an example communication network in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

For NR positioning, the following positioning solutions are specified in Release 16: Downlink Time Difference of Arrival (DL-TDOA), Uplink Time Difference of Arrival (UL-TDOA), Downlink Angle of Departure (DL-AoD), Uplink Angle of Arrival (UL-AoA), and Multi-cell Round Trip Time (Multi-RTT). In Release 17, NR positioning enhancement work is started and focused on increasing accuracy, reducing latency and increasing efficiency (low complexity; low power consumption; low overhead) based on Release 16 solutions.

In LTE positioning, there was a logical unit called the location measurement unit (LMU) which could be co-located or non-located with a base station, in order to support UL positioning method (e.g., UL-TDOA). In NR, this terminology has shifted somewhat and now UL positioning-only RPs are supported. These UL positioning-only RPs are capable of receiving UL signals and making positioning measurements, e.g., UL AoA or relative time of arrival (RTOA).

It is well known in the positioning area that a higher number of measurement points generally increases the positioning accuracy. As very high accuracy is required for some NR positioning use cases, it is feasible that UL positioning-only RPs may be deployed to meet these requirements. The UL positioning-only RPs do not transmit reference signals, that is, have no full capabilities of a gNB, which makes them cheaper to deploy.

As mentioned above, for transmitting SRS towards the UL positioning-only RPs, beam sweeping is the only option. However, without any pre-knowledge, the UE may need to transmit SRS to all directions. Such operation leads to a large resource overhead and UE power consumption for positioning purpose. Thus, from network and device efficiency point of view, it is beneficial to develop an enhanced solution for transmit beamforming for UL positioning.

In order to solve the above and other potential problems, embodiments of the present disclosure provide an improved solution for transmit beamforming (i.e., transmit beam determination) for positioning. In the solution, a location management device such as a network element having a location management function (LMF) estimates an angle (for convenience, also referred to as an expected AoD or an expected angle herein) expected for transmission of a reference signal (RS) for positioning, and transmits the expected angle directly or indirectly to a device transmitting the RS. This solution can be applied in UL positioning based on a UL RS and also can be applied in DL positioning based on a DL RS. Of course, this solution also can be applied in positioning based on both UL RS and DL RS.

In some embodiments for UL positioning, the location management device may estimate an expected angle for transmission of a UL RS from a terminal device, and transmit the expected angle to a network device serving the terminal device or to both the network and terminal devices. Thereby, a determination of transmit beamforming at the terminal device can be facilitated.

In some embodiments for DL positioning, the location management device may estimate an expected angle for transmission of a DL RS from a network device, and transmit the expected angle to the network device. Thereby, a determination of transmit beamforming at the network device can be facilitated.

With the solution, power savings of the terminal device or the network device can be achieved due to decreased reference signal overhead for transmit beam determination. Further, positioning accuracy can be improved through appropriately beamformed RS transmissions.

Some example embodiments of the present disclosure will now be described in detail with reference to the figures. However, those skilled in the art would readily appreciate that the detailed description given herein with respect to these figures is for explanatory purpose as the present disclosure extends beyond theses limited embodiments.

Example of Communication Network

FIG. 1 illustrates an example communication network 100 in which embodiments of the present disclosure can be implemented. As shown in FIG. 1, the communication network 100 includes a first device 110, a second device 120, a third device 130 and a location management device 140. The first device 110 may provide one or more cells for the second device 120. The location management device 140 may be implemented as LMF in a core network. Of course, the location management device 140 may also be implemented in a radio access network (RAN). If the location management device 140 is implemented in the RAN, it may be referred to as a local management component (LMC).

The third device 130 may be a device for positioning or measuring the second device 120. In some embodiments, the third device 130 may be a transmission and reception point (TRP). In these embodiments where the third device 130 is a TRP, the third device 130 may receive a UL RS from the second device 120 for UL positioning, and may also transmit a DL RS to the second device 120 for DL positioning. In some embodiments, UL RS may be a SRS, physical random access channel (PRACH) signal or any other suitable RSs for UL positioning. In some embodiments, DL RS may be SSB, DL PRS, CSI-RS or any other suitable RSs for DL positioning.

In some embodiments, the third device 130 may be a UL positioning-only RP. In these embodiments where the third device 130 is a UL positioning-only RP, the third device 130 only receive a UL RS from the second device 120, and does not transmit a DL RS to the second device 120.

Although only one third device is shown, the network device 100 may include a plurality of third devices. For illustration, the third device 130 is shown as a network device. It is to be noted that, in some other embodiments, the third device 130 may be implemented as a terminal device. In some embodiments, the first device 110 may serve as one of the third devices.

For illustration, the first device 110 is shown as a network device and the second device 120 is shown as a terminal device. Merely for illustration purpose and without suggesting any limitations as to the scope of the present disclosure, some embodiments will be described in the context where the first device 110 is a network device and the second device 120 is a terminal device. It is to be understood that, in other embodiments, the first device 110 may be a terminal device and the second device 120 may be a network device. In other words, the principles and spirits of the present disclosure can be applied to both uplink and downlink transmissions.

It is also to be understood that the number of first and second devices and that of the location management device as shown in FIG. 1 are only for the purpose of illustration without suggesting any limitations. The network 100 may include any suitable number of first and second devices and location management devices adapted for implementing embodiments of the present disclosure.

As shown in FIG. 1, the first device 110 and the second device 120 may communicate with each other via a channel such as a wireless communication channel. For example, the first device 110 and the second device 120 may communicate with each other via Uu interface. The first device 110 and the location management device 140 may communicate with each other via a NR positioning protocol A (NRPPa) protocol. The second device 120 and the location management device 140 may communicate with each other via a LTE positioning protocol (LPP) protocol.

The third device 130 and the second device 120 may communicate with each other via a channel such as a wireless communication channel. The third device 130 and the location management device 140 may communicate with each other via the NRPPa protocol.

The communications in the network 100 may conform to any suitable standards including, but not limited to, LTE, LTE-evolution, LTE-advanced (LTE-A), wideband code division multiple access (WCDMA), code division multiple access (CDMA) and global system for mobile communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In some scenarios, the location management device 140 may be requested to position the second device 120, and then initiate a positioning procedure based on a UL RS. DL RS or both. During an UL positioning procedure based on a UL RS, the second device 120 may transmit UL RSs to one or more third devices such as the third device 130, and the one or more third devices perform measurements on the UL RSs and transmit the measurement results to the location management device 140. Based on the reported measurement results, the location management device 140 can do the positioning for the second device 120.

During a DL positioning procedure based on a DL RS, the one or more third devices such as the third device 130 may transmit DL RSs to the second device 120, and the second device perform measurements on the DL RSs and transmit the measurement results to the location management device 140. Based on the reported measurement results, the location management device 140 can do the positioning for the second device 120.

During a positioning procedure based on both a UL RS and a DL RS, the second device 120 may transmit UL RSs to the one or more third devices such as the third device 130, and the one or more third devices perform measurements on the UL RSs and transmit the measurement results to the location management device 140. The one or more third devices such as the third device 130 may transmit DL RSs to the second device 120, and the second device perform measurements on the DL RSs and transmit the measurement results to the location management device 140. Based on the reported measurement results from the second device 120 and the one or more third devices, the location management device 140 can do the positioning for the second device 120.

Figure 2A:
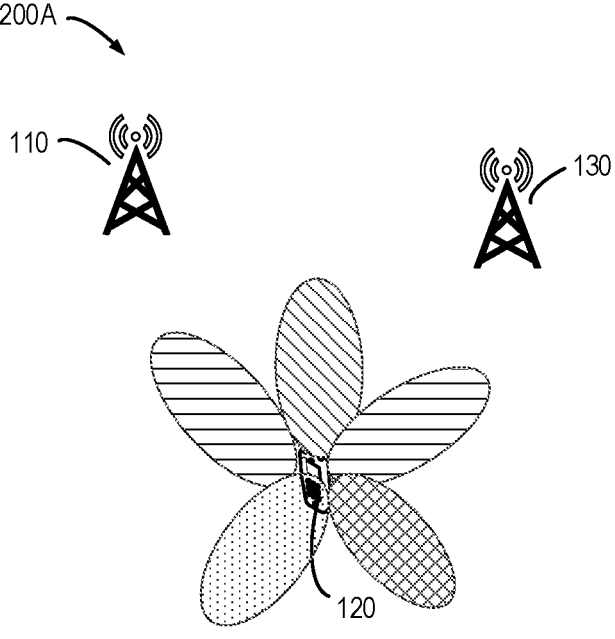
FIG. 2A illustrates a diagram illustrating beam sweeping for transmitting SRS towards an UL positioning-only RP according to conventional solution.

Typically, for a third device which is a UL positioning-only RP, the second device 120 may need to transmit the UL RSs to all directions. FIG. 2A illustrates a diagram 200A illustrating beam sweeping for transmitting RSs towards UL positioning-only RP according to conventional solution. As shown in FIG. 2A, the second device 120 may perform beam sweeping at all directions and transmit the RSs to all directions, i.e., 360 degree view. Such operation will lead to large resource overhead and UE power consumption for positioning purpose.

In view of this, embodiments of the present disclosure provide a transmit beamforming mechanism for positioning with a RS transmitting towards a third device or from the third device. The core part of the mechanism is to let the location management device 140 determine and indicate an expected AoD to the first device 110 or to both the first and second devices 110 and 120 or to the third device 130. Based on the received AoD, the first device 110 and the second device 120 can determine how to perform transmit beamforming for transmission of RSs towards the third device 130. Based on the received AoD, the third device 130 can determine how to perform transmit beamforming for transmission of RSs towards the second device 120.

Figures 2B, 3:
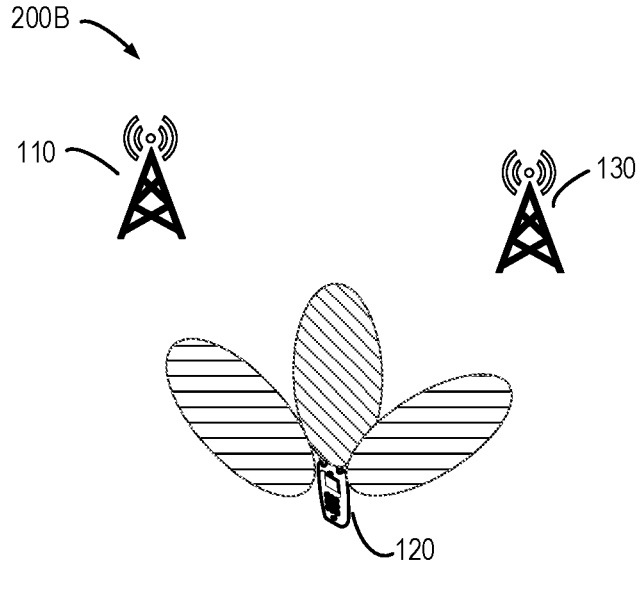
FIG. 2B illustrates a diagram illustrating beam sweeping for transmitting SRS towards an UL positioning-only RP according to some embodiments of the present disclosure.
FIG. 3 illustrates a diagram illustrating a principle of determining an angle of departure (AoD) expected for a transmit beamforming for UL positioning according to some embodiments of the present disclosure.

With this mechanism, beam sweeping can be performed at only part of the directions, not at all the directions. FIG. 2B illustrates a diagram 200B illustrating beam sweeping for transmitting RSs towards UL positioning-only RP according to some embodiments of the present disclosure. As shown in FIG. 2B, the second device 120 may perform beam sweeping at only a part of the directions. More details will be described below in connection with FIGS. 3 to 8.

Example Implementation of UL Positioning

FIG. 3 illustrates a diagram 300 illustrating a principle of determining an expected AoD for UL positioning according to some embodiments of the present disclosure. As shown in FIG. 3, the expected AoD 320 can be determined based on estimated location area 310 of the second device 120 and the location of the third device 130. A dashed line 301 and a dashed line 302 are two tangent lines from the third device 130 to the estimated location area 310. The angle formed by the dashed lines 301 and 302 actually represent the range of AoA of the second device 120 at the third device 130. With mirror-image relation, i.e., using geometric relationships, these two tangent lines help to determine the range of AoD from the second device 120 to the third device 130.

As shown in FIG. 3, a solid line 303 is in parallel with the dashed line 302, and a solid line 304 is in parallel with the dashed line 301. The angle formed by the solid lines 303 and 304 actually represent the range of AoD from the second device 120 to the third device 130, i.e., the expected AoD 320.

On basis of the above principle, embodiments of the present disclosure provide some example processes of communication for determination of transmit beamforming at the second device 120 toward the third device 130. This will be described in Embodiments 1 and 2 with reference to FIGS. 4 to 6.

Embodiment 1

Figure 4:
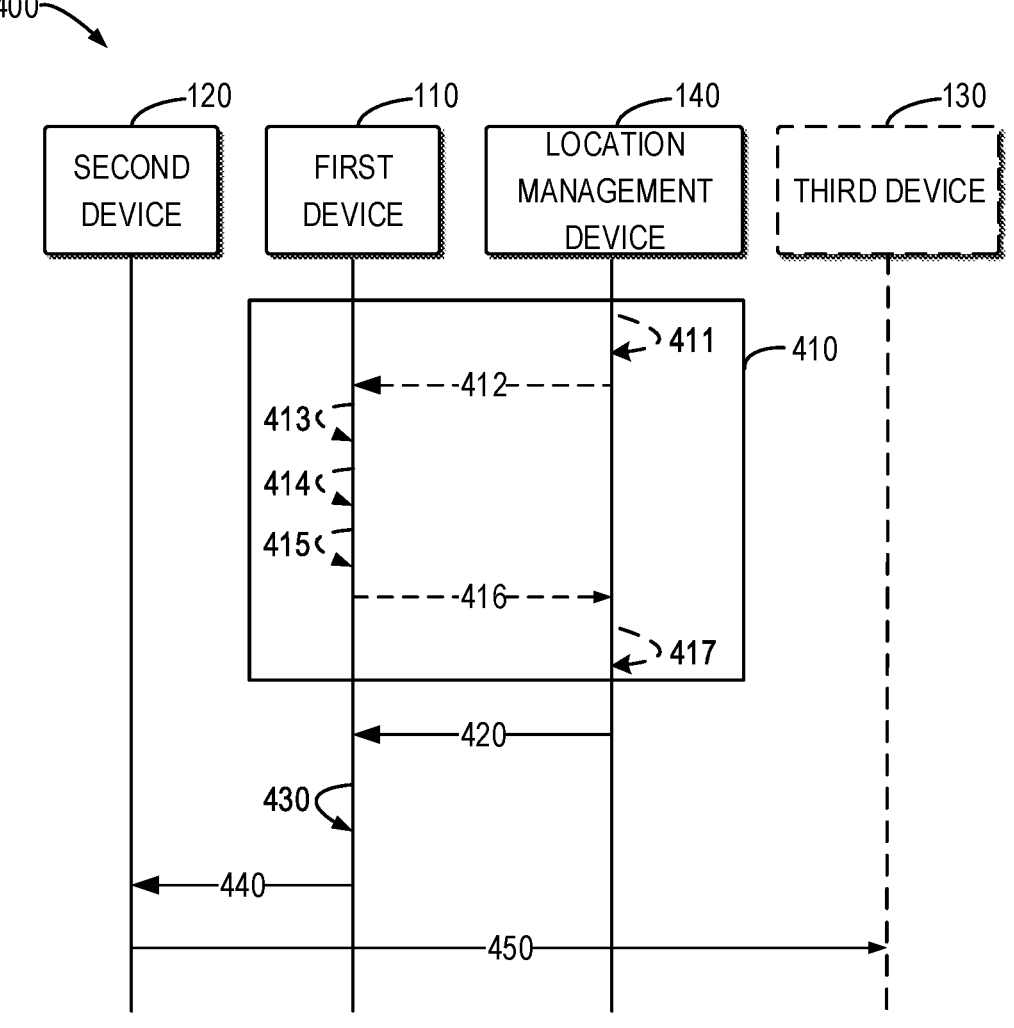
FIG. 4 illustrates a flowchart illustrating an example process of communication for UL positioning according to some embodiments of the present disclosure.

FIG. 4 illustrates a flowchart illustrating an example process 400 of communication for UL positioning according to some embodiments of the present disclosure. For convenience, the following description will be made in connection with the context of FIG. 1. Assuming that the second device 120 is a device to be positioned, and is in a serving cell provided by the first device 110. In this embodiment, the location management device 140 indicates an expected AoD to the first device 110.

As shown in FIG. 4, for positioning the second device 120, the location management device 140 generates 410 information regarding an expected AoD (for convenience, also referred to as a first expected AoD herein) for transmission of UL RSs (also referred to as first reference signals herein) for positioning of the second device 120. The expected AoD is an angle expected for transmission of the RSs towards a third device (for example, the third device 130). In some embodiments, the expected AoD may be a Zenith Angles of Departure. In some embodiments, the expected AoD may be an Azimuth Angles of Departure. The RSs may be SRSs or physical random access channel (PRACH) signals or any other suitable UL RSs. For convenience, the following description is made by taking SRSs as an example of the UL RSs.

In some embodiments, the location management device 140 may calculate the expected AoD based on past measurements (for example, past measurements reports) received from the third device 130. For example, the past measurements reports may be an AoA measurement from a past SRS reception at the third device 130. In this case, the expected AoD may be the back bearing of the AoA (i.e., AoA+180°). As another example, the past measurements may be SRS-RSRP measurements from the third device 130. In this case, the location management device 140 may determine that a particular beam direction would be best and determine the expected AoD based on the particular beam direction. In some embodiments, if the location management device 140 knows the second device 120's antenna or beam configuration, it can then calculate the expected AoD.

In some alternative embodiments, the location management device 140 may determine the expected AoD by a known location of the third device 130 and approximate location area of the second device 120. More details will be described below.

In some embodiments, the location management device 140 may determine 411 an estimated location of the second device 120. In some embodiments, the location management device 140 may determine the estimated location of the second device 120 based on a past location or previous location of the second device 120. For example, the location management device 140 may estimate the location of the second device 120 based on the previous location of the second device before a period of time. Of course, any other suitable ways using past location of the second device 120 are also feasible.

Figure 5:
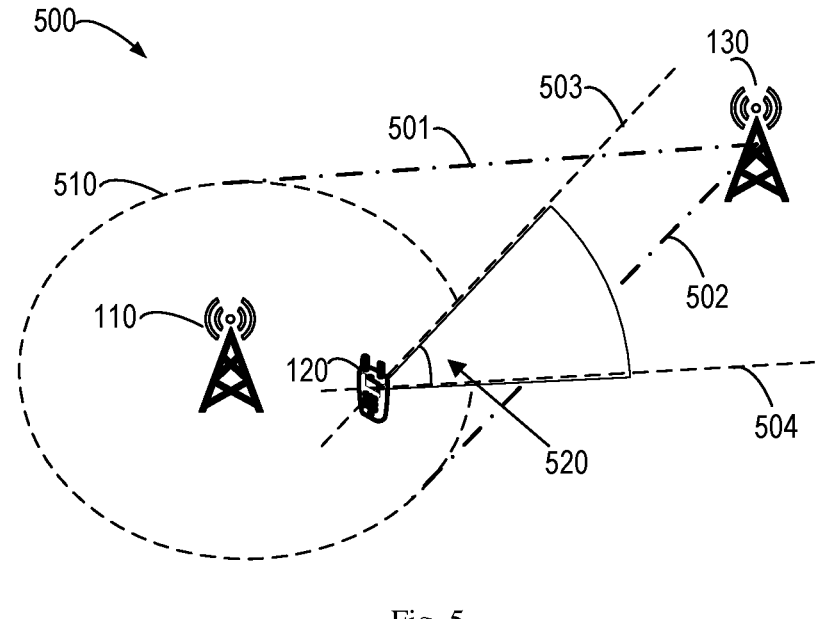
FIG. 5 illustrates a diagram illustrating a process of determining the expected AoD based on coverage area of a serving cell according to some embodiments of the present disclosure.

In some embodiments, the location management device 140 may determine the estimated location of the second device 120 based on a coverage area of a serving cell of the second device 120, i.e., the cell coverage area of the first device 110. FIG. 5 illustrates a diagram illustrating a process 500 of determining the expected AoD based on coverage area of a serving cell according to some embodiments of the present disclosure.

As shown in FIG. 5, the expected AoD 520 can be determined based on a coverage area 510 of the first device 110 and the location of the third device 130. The location of the third device 130 is known. A dashed line 501 and a dashed line 502 are two tangent lines from the third device 130 to the estimated location area 510. The angle formed by the dashed lines 501 and 502 actually represent the range of AoA of the second device 120 at the third device 130. With mirror-image relation, i.e., using geometric relationships, these two tangent lines help to determine the range of AoD from the second device 120 to the third device 130. As shown in FIG. 5, a solid line 503 is in parallel with the dashed line 502, and a solid line 504 is in parallel with the dashed line 501. The angle formed by the solid lines 503 and 504 actually represent the range of AoD from the second device 120 to the third device 130, i.e., the expected AoD 520.

In some embodiments, the location management device 140 may obtain the estimated location of the second device 120 from the first device 110. As shown in FIG. 4, the location management device 140 may transmit 412, to the first device 110, a request for positioning the second device 120. For example, the location management device 140 may request UL positioning.

As a response to the request, the first device 110 may determine 413 an angle range in which the second device 120 is located. It is to be noted that in some embodiments, the angle range may comprise only an angle. In some embodiments, the first device 110 may determine the angle range by measuring an AoA based on reference signals (also referred to as second reference signals) transmitted from the second device 120. The second reference signals may be any UL reference signals transmitted from the second device 120. For example, the second reference signals may be SRSs for positioning. As another example, the second reference signals may be PRACH signals. Of course, any other UL reference signals used for data transmission are also feasible. It should be noted that any other suitable ways may also be adopted to determine the angel range.

On the other hand, the first device 110 may determine 414 a distance range to the second device 120. In some embodiments, the first device 110 may estimate the distance to the second device 120 based on a receive signal strength indication (RSSI) for the second reference signals transmitted from the second device 120. In some embodiments, the first device 110 may estimate the distance range to the second device 120 based on reference signal receive power (RSRP) for the second reference signals transmitted from the second device 120. In some embodiments, the first device 110 may estimate the distance range to the second device 120 based on a timing advance (TA) for the reference signals transmitted from the second device 120. In some embodiments, the first device 110 may estimate the distance range to the second device 120 by measuring a time of arrival (ToA) for the reference signals transmitted from the second device 120. It should be noted that these merely are some examples, and any other suitable ways are also feasible to determine the distance range to the second device 120.

Based on the angle range and the distance range, the first device 110 may determine 415 the estimated location of the second device 120, i.e., approximate location area of the second device 120. Then the first device 110 may transmit 416 the estimated location of the second device 120 to the location management device 140.

So far, the location management device 140 can acquire the knowledge of approximate location area (i.e., the estimated location) of the second device 120. It should be noted that the above examples are merely for illustration and are not for limitation. The estimated location of the second device 120 can be obtained by any suitable ways existing or to be developed.

Upon determination of the estimated location of the second device 120, the location management device 140 determines 417 the expected AoD based on the estimated location of the second device 120 and in combination with a known location of the third device 130, for example, as shown in FIG. 3. In this way, the information regarding the expected AoD can be generated.

With reference to FIG. 4, the location management device 140 transmits 420 the information regarding the expected AoD to the first device 110. In some embodiments, the location management device 140 may indicate the expected AoD to the first device 110 via the NRPPa protocol. For example, the location management device 140 may indicate the expected AoD as a part of a message "POSITIONING INFORMATION REQUEST", when the location management device 140 requests SRS configuration information of the second device 120 from the first device 110. Of course, any other suitable ways are also feasible.

Upon receipt of the information regarding the expected AoD, the first device 110 determines 430 a configuration for the transmission of the SRSs. In some embodiments, the first device 110 may determine, based on the expected AoD, SRS configurations indicating a set of resources (also referred to as SRS resources herein) for the transmission of the SRSs. That is, the first device 110 may determine how much SRS resources should be configured to the second device 120. For example, if the range of the expected AoD is very large, the first device 110 may configure more resources to the second device 120 for positioning SRS transmission, and vice versa. In some embodiments, the first device 110 may determine the SRS resources based on the expected AoD and in combination with the capability of the second device 120.

In some embodiments, in addition to the SRS configurations, the first device 110 may also determine transmit beamforming configurations expected for the transmission of the SRSs. The transmit beamforming configurations may comprise a range of direction where the second device 120 transmits SRSs to. Of course, any other suitable information may be also comprised in the transmit beamforming configurations. In some embodiments, the expected AoD may be a range (e.g. 45-55 degrees) and also have an uncertainty related to it. The first device 110 may determine the beam width at least partially based on the uncertainty of the expected AoD. In this case, the configuration for the transmission of the SRSs may comprise both the SRS configurations and the transmit beamforming configurations.

In some embodiments, the first device 110 may determine a reference direction and angle offsets with respect to the reference direction. In this way, the range of direction can be determined. Of course, the range of direction may also be provided in any other suitable ways.

In some embodiments, the reference direction may be the transmit direction or receive direction of the second device 120 towards the first device 110. In some embodiments, the angle offsets may be two angle values (for example, +30° and +90°) based on the reference direction. For example, the first device 110 may expect the second device 120 to transmit SRSs in the direction range of turning 30°~90° clockwise compared to direction of transmitting data to the first device 110. In this way, even the second device 120 which is orientation unaware can still be configured using the expected AoD.

Upon determination of the configuration, the first device 110 transmits 440 the configuration to the second device 120. Upon receipt of the configuration, the second device 120 transmits 450 the SRSs to the third device 130. In some embodiments, the second device 120 may determine transmit beamforming for transmission of the SRSs by taking the transmit beamforming configurations in the configuration into account. That is, the second device 120 can knows, from the configuration, how to perform beam sweeping of transmitting SRS towards the third device 130 in a better way.

Then the third device 130 may perform measurements on the SRSs and return a result of the measurements to the location management device 140 for positioning of the second device 120.

In Embodiment 1, the configuration from the first device 110 is determined based on the expected AoD, which ensures that the second device 120 makes the best decision about how to select transmit beams for UL positioning toward the third device 130. As a result, power savings of the second device 120 can be achieved due to decreased SRS overhead for beam sweeping. Further, positioning accuracy can be improved through appropriately beamformed SRS transmissions.

Embodiment 2

Figure 6:
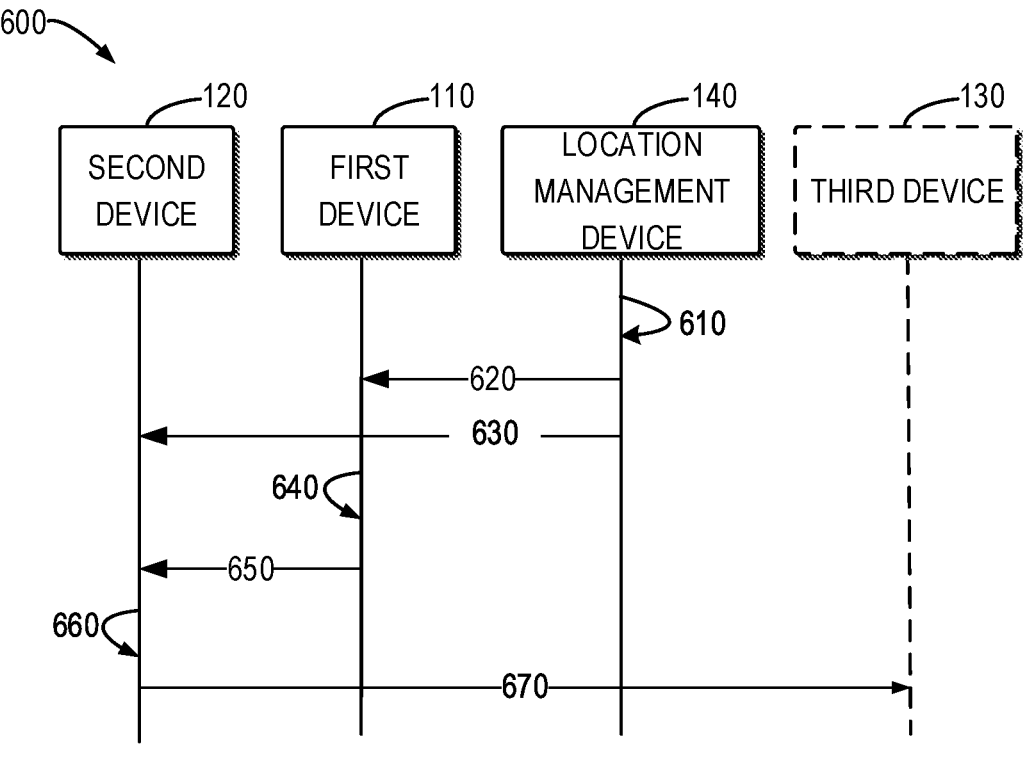
FIG. 6 illustrates a flowchart illustrating another example process of communication for UL positioning according to some embodiments of the present disclosure.

FIG. 6 illustrates a flowchart illustrating another example process 600 of communication for UL positioning according to some embodiments of the present disclosure. For convenience, the following description will be made in connection with the context of FIG. 1. Assuming that the second device 120 is a device to be positioned and is in a serving cell provided by the first device 110, and also assuming that the second device 120 is orientation aware. In this embodiment, the location management device 140 indicates an expected AoD to both the first device 110 and the second device 120.

As shown in FIG. 6, the location management device 140 generates 610 information regarding an expected AoD (for convenience, also referred to as a first expected AoD herein) for transmission of UL RSs (also referred to as first reference signals herein) for positioning of the second device 120. The expected AoD is an angle expected for transmission of RSs towards a third device (for example, the third device 130). The RSs may be SRSs or PRACH signals or any other suitable UL RSs. For convenience, the following description is made by taking SRSs as an example of the UL RSs. The implementation of the generation is similar to that described in connection with 410 in FIG. 4, and thus is not repeated here for concise.

Upon generation of the information regarding the expected AoD, the location management device 140 transmits 620 the information to the first device 110. The implementation of this transmission is similar to that described in connection with 420 in FIG. 4, and thus is not repeated here for concise.

In this embodiment, the location management device 140 also transmits 630 the information to the second device 120. In some embodiments, the location management device 140 may indicate the expected AoD to the second device 120 via the LPP protocol. For example, the location management device 140 may indicate the expected AoD to the second device 120 via a new message. It is helpful for the second device 120 to determine transmit beamforming. Of course, any other suitable existing messages are also feasible.

Upon receipt of the information regarding the expected AoD, the first device 110 determines 640 a configuration for the transmission of the SRSs. In some embodiments, the first device 110 may determine, based on the expected AoD, a set of resources (also referred to as SRS resources herein) for the transmission of the SRS. For example, the first device 110 may determine the SRS resources based on the expected AoD and in combination with the capability of the second device 120. In this case, the configuration for the transmission of the SRSs may comprise the SRS resources.

In some embodiments, in addition to the SRS resources, the first device 110 may also determine transmit beamforming configurations expected for the transmission of the SRSs. The transmit beamforming configurations may comprise a range of direction where the second device 120 transmits SRSs to. Of course, any other suitable information may be also comprised in the transmit beamforming configurations. In some embodiments, the expected AoD may be a range (e.g. 45-55 degrees) and also have an uncertainty related to it. The first device 110 may determine the beam width at least partially based on the uncertainty of the expected AoD. In this case, the configuration for the transmission of the SRSs may comprise both the SRS resources and the transmit beamforming configurations.

Upon determination of the configuration, the first device 110 transmits 650 the configuration to the second device 120. As a result, the second device 120 receives the SRS resources from the first device 110 and the expected AoD from the location management device 140.

Then the second device 120 determines 660 transmit beamforming (also referred to as a beamforming solution herein) for the transmission of the SRSs based on the SRS resources and the expected AoD. Assuming the second device 120 knows its orientation, e.g., via gyroscope or the like. In some embodiments where the configuration comprises the SRS resources, the second device 120 may further determine its transmit beamforming for each SRS resource, and the second device 120 may make sure that the aggregated transmission directions of all the SRSs should cover the expected AoD.

In some embodiments where the configuration comprises both the SRS resources and the expected transmit beamforming configurations, the second device 120 may take the expected transmit beamforming configuration into account for SRS beamforming. In some embodiments, the expected AoD may be a range (e.g., 45-55 degrees) and also have an uncertainty related to it. The second device 120 may determine the beam width at least partially based on the uncertainty of the expected AoD.

It is to be understood that the processes 400 and 600 according to embodiments of the present disclosure can also be applied in combination.

Example Implementation of DL Positioning

Figure 7:
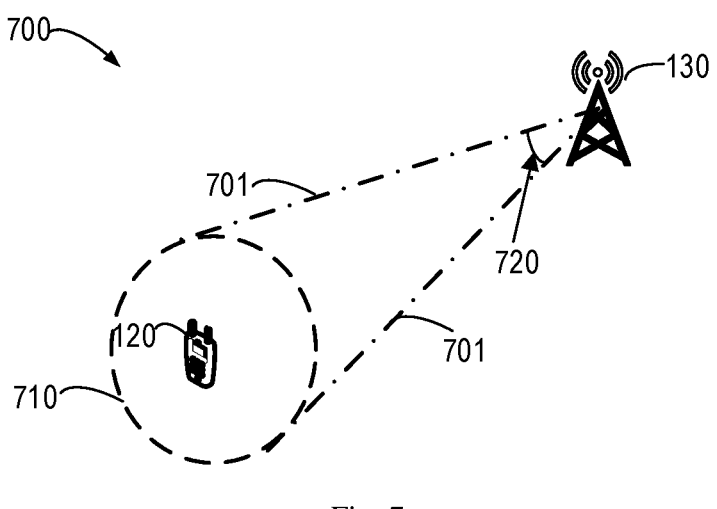
FIG. 7 illustrates a diagram illustrating a principle of determining an AoD expected for a transmit beamforming for DL positioning according to some embodiments of the present disclosure.

FIG. 7 illustrates a diagram 700 illustrating a principle of determining an expected AoD for DL positioning according to some embodiments of the present disclosure. As shown in FIG. 7, the expected AoD 720 can be determined based on estimated location area 710 of the second device 120 and the location of the third device 130. A dashed line 701 and a dashed line 702 are two tangent lines from the third device 130 to the estimated location area 710. The angle formed by the dashed lines 701 and 702 actually represent the range of AoD from the third device 130 to the second device 120, i.e., the expected AoD 720.

On basis of the above principle, embodiments of the present disclosure provide some example processes of communication for determination of transmit beamforming at the third device 130 towards the second device 120. This will be described in Embodiment 3 with reference to FIG. 8.

Embodiment 3

Figure 8:
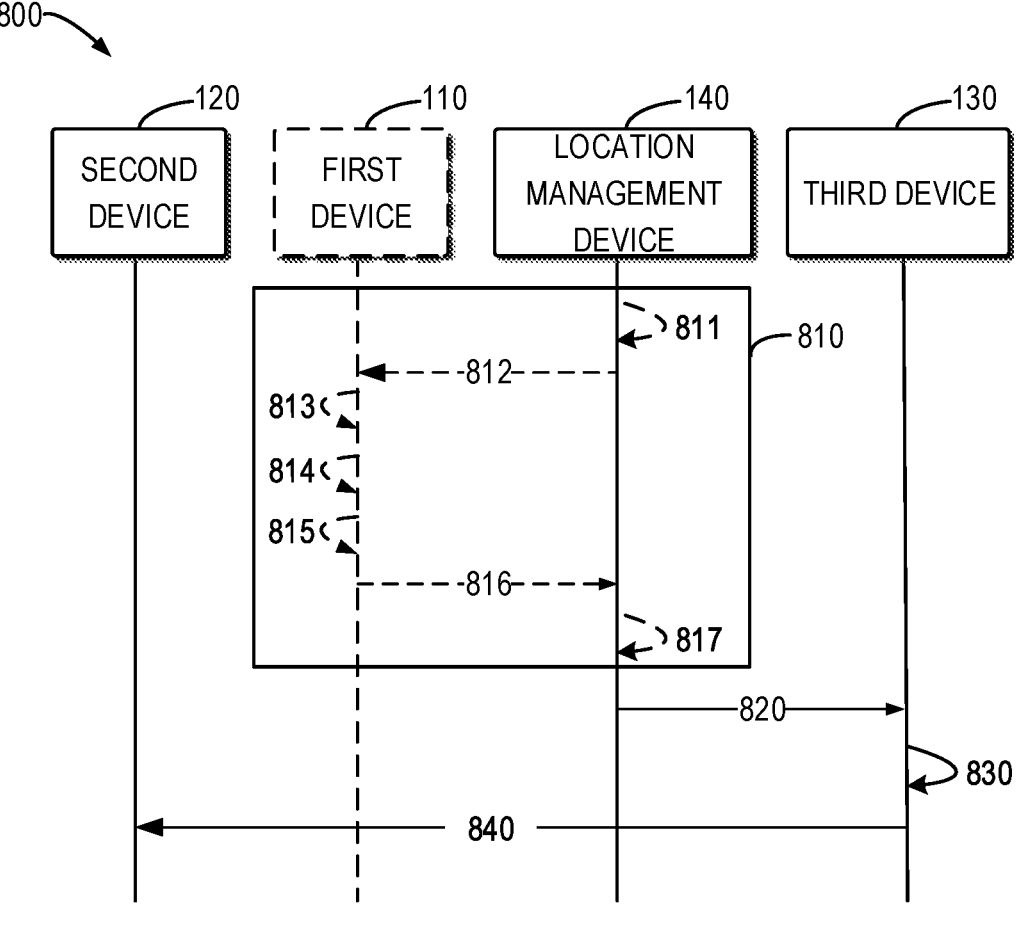
FIG. 8 illustrates a flowchart illustrating an example process of communication for DL positioning according to some embodiments of the present disclosure.

FIG. 8 illustrates a flowchart illustrating an example process 800 of communication for DL positioning according to some embodiments of the present disclosure. For convenience, the following description will be made in connection with the context of FIG. 1. Assuming that the second device 120 is a device to be positioned, and is in a serving cell provided by the first device 110. In this embodiment, the location management device 140 indicates an expected AoD to the third device 130 for transmission of a DL RS. Further, in this embodiment, the third device 130 is a TRP.

As shown in FIG. 8, for positioning the second device 120, the location management device 140 generates 810 information regarding an expected AoD (for convenience, also referred to as a second expected AoD herein) for transmission of DL RSs (also referred to as third reference signals herein) for positioning of the second device 120. The expected AoD is an angle expected for transmission of the DL RSs towards the second device 120. In some embodiments, the expected AoD may be a Zenith Angles of Departure. In some embodiments, the expected AoD may be an Azimuth Angles of Departure. The DL RSs may be DL PRS or SSB or CSI-RS or any other suitable DL RSs.

In some embodiments, the location management device 140 may calculate the expected AoD based on past measurements (for example, past measurements reports) received from the second device 120. For example, the past measurements reports may be an AoA measurement from a past DL RS reception at the second device 120. In this case, the expected AoD may be the back bearing of the AoA (i.e., AoA+180°). As another example, the past measurements may be DL RS-RSRP measurements from the second device 120. In this case, the location management device 140 may determine that a particular beam direction would be best and determine the expected AoD based on the particular beam direction. In some embodiments, if the location management device 140 knows the third device 130's antenna or beam configuration, it can then calculate the expected AoD.

In some alternative embodiments, the location management device 140 may determine the expected AoD by a known location of the third device 130 and approximate location area of the second device 120. More details will be described below.

In some embodiments, the location management device 140 may determine 811 an estimated location of the second device 120. In some embodiments, the location management device 140 may determine the estimated location of the second device 120 based on a past location or previous location of the second device 120. For example, the location management device 140 may estimate the location of the second device 120 based on the previous location of the second device before a period of time. Of course, any other suitable ways using past location of the second device 120 are also feasible.

In some embodiments, the location management device 140 may determine the estimated location of the second device 120 based on a coverage area of a serving cell of the second device 120, i.e., the cell coverage area of the first device 110. Its details are similar to that described in connection with FIG. 5, and thus are not repeated here.

In some embodiments, the location management device 140 may obtain the estimated location of the second device 120 from the first device 110. As shown in FIG. 8, the location management device 140 may transmit 812, to the first device 110, a request for positioning the second device 120. For example, the location management device 140 may request DL positioning.

As a response to the request, the first device 110 may determine 813 an angle range in which the second device 120 is located. It is to be noted that in some embodiments, the angle range may comprise only an angle. In some embodiments, the first device 110 may determine the angle range by measuring an AoA based on reference signals (also referred to as second reference signals) transmitted from the second device 120. The second reference signals may be any UL reference signals transmitted from the second device 120. For example, the second reference signals may be SRSs for positioning. As another example, the second reference signals may be PRACH signals. Of course, any other UL reference signals used for data transmission are also feasible. It should be noted that any other suitable ways may also be adopted to determine the angel range.

On the other hand, the first device 110 may determine 814 a distance range to the second device 120. In some embodiments, the first device 110 may estimate the distance to the second device 120 based on a receive signal strength indication (RSSI) for the second reference signals transmitted from the second device 120. In some embodiments, the first device 110 may estimate the distance range to the second device 120 based on RSRP for the second reference signals transmitted from the second device 120. In some embodiments, the first device 110 may estimate the distance range to the second device 120 based on a TA for the reference signals transmitted from the second device 120. In some embodiments, the first device 110 may estimate the distance range to the second device 120 by measuring a ToA for the reference signals transmitted from the second device 120. It should be noted that these merely are some examples, and any other suitable ways are also feasible to determine the distance range to the second device 120.

Based on the angle range and the distance range, the first device 110 may determine 815 the estimated location of the second device 120, i.e., approximate location area of the second device 120. Then the first device 110 may transmit 816 the estimated location of the second device 120 to the location management device 140.

So far, the location management device 140 can acquire the knowledge of approximate location area (i.e., the estimated location) of the second device 120. It should be noted that the above examples are merely for illustration and are not for limitation. The estimated location of the second device 120 can be obtained by any suitable ways existing or to be developed.

Upon determination of the estimated location of the second device 120, the location management device 140 determines 817 the expected AoD based on the estimated location of the second device 120 and in combination with a known location of the third device 130, for example, as shown in FIG. 7. In this way, the information regarding the expected AoD can be generated.

With reference to FIG. 8, the location management device 140 transmits 820 the information regarding the expected AoD to the third device 130. In some embodiments, the location management device 140 may indicate the expected AoD to the third device 130 via the NRPPa protocol.

Upon receipt of the information regarding the expected AoD, the third device 130 determines 830 a transmit beamforming (also referred to as a beamforming solution herein) for the transmission of the DL RSs based on the expected AoD. The transmit beamforming may comprise a range of direction where the third device 130 transmits the DL RSs to. In some embodiments, the expected AoD may be a range (e.g. 45-55 degrees) and also have an uncertainty related to the expected AoD. The third device 130 may determine the beam width at least partially based on the uncertainty of the expected AoD.

Upon determination of the transmit beamforming, the third device 130 transmits 840 the DL RSs to the second device 120. Then the second device 120 may perform measurements on the DL RSs and return a result of the measurements to the location management device 140 for positioning of the second device 120.

In Embodiment 3, the expected AoD is provided by the location management device 140 to the third device 130, which ensures that the third device 130 makes the best decision about how to select transmit beams for DL positioning toward the second device 120. As a result, power savings of the third device 130 can also be achieved due to decreased DL RS overhead. Further, positioning accuracy can be improved through appropriately beamformed DL RS transmissions.

According to embodiments of the present disclosure, the expected AoD is provided as additional assistance data. This new assistance data can ensure a device transmitting RSs for positioning makes the best decision about how to select transmit beams for the transmission of the RSs. Thus, power savings of the related device can be achieved due to decreased RS overhead. Further, positioning accuracy can be improved through appropriately beamformed RS transmissions.

Example Implementation of Methods

Corresponding to the processes described in connection with FIGS. 4 to 6, embodiments of the present disclosure provide methods of communication implemented at a first device, at a second device, and at a location management device. These methods will be described below with reference to FIGS. 9 to 11.

FIG. 9 illustrates a flowchart of a method 900 of communication for UL positioning implemented at a first device according to example embodiments of the present disclosure. The method 900 can be implemented at the first device 110 shown in FIG. 1. For the purpose of discussion, the method 900 will be described with reference to FIG. 1. It is to be understood that method 900 may further include additional blocks not shown and/or omit some shown blocks, and the scope of the present disclosure is not limited in this regard.

As shown in FIG. 9, at block 910, the first device 110 receives, from the location management device 140, information regarding a first AoD, the first AoD being expected for transmission of first reference signals to the third device 130 for positioning a second device. In some embodiments, the first device 110 may receive, from the location management device 140, a request for positioning the second device 120. In these embodiments, determine an estimated location of the second device; and the first device 110 may transmit the estimated location to the location management device 140. In some embodiments, the first device 110 may determine an angle range in which the second device 120 is located, determine a distance range to the second device 120, and determine the estimated location of the second device 120 based on the angle range and the distance range.

In some embodiments, the first device 110 may determine the angle range by determining an AoA for second reference signals transmitted from the second device 120. In some embodiment, the first device 110 may determine the distance range by determining the distance range based on at least one of a RSSI, RSRP, a TA or a ToA for second reference signals transmitted from the second device 120.

At block 920, the first device 110 determines, based on the information, a configuration for the transmission of the first reference signals. In some embodiments, the first device 110 may determine the configuration by determining, based on the first AoD and a capability of the second device 120, a set of resources for the transmission of the first reference signals. In some embodiments, the first device 120 may further determine the configuration by determining, based on the first AoD, a range of direction for the transmission of the first reference signals. In some embodiments, the first device 110 may determine the range of direction by determining a reference direction and angle offsets with respect to the reference direction.

At block 930, the first device 110 transmits the configuration to the second device 120. In this way, determination of transmit beamforming at the second device 120 can be facilitated.

FIG. 10 illustrates a flowchart of a method 1000 of communication for UL positioning implemented at a second device according to example embodiments of the present disclosure. The method 1000 can be implemented at the second device 120 shown in FIG. 1. For the purpose of discussion, the method 1000 will be described with reference to FIG. 1. It is to be understood that method 1000 may further include additional blocks not shown and/or omit some shown blocks, and the scope of the present disclosure is not limited in this regard.

As shown in FIG. 10, at block 1010, the second device 120 receives, from the first device 110, a configuration for transmission of first reference signals, the configuration being determined by the first device 110 based on information regarding a first AoD from the location management device 140, the first AoD being expected for the transmission of the first reference signals to the third device 130.

In some embodiments, the second device 120 may receive a set of resources for the transmission of the first reference signals, the set of resources being determined by the first device 110 based on the first AoD and a capability of the second device 120. In some embodiments, the second device 120 may also receive a range of direction expected for the transmission of the first reference signals, the range of direction being determined by the first device 110 based on the first AoD. In some embodiments, the second device 120 may receive the range of direction by receiving a reference direction and angle offsets with respect to the reference direction.

At block 1020, the second device 120 transmits the first reference signals to the third device 130 based on the configuration. In some embodiments where the configuration received from the first device 110 comprises the set of resources and the range of direction, the second device 120 may determine the beamforming solution based on the set of resources and the range of direction and transmit the first reference signals based on the beamforming solution.

In some embodiments, the second device 120 may also receive, from the location management device 140, the information regarding the first AoD. In these embodiments, the second device 120 may determine, based on the configuration and the information, a beamforming solution for the transmission of the first reference signals. In some embodiments where the configuration received from the first device 110 comprises the set of resources, the second device 120 may determine the beamforming solution based on the set of resources and the first AoD. In some embodiments where the configuration received from the first device 110 comprises the set of resources and the range of direction, the second device 120 may determine the beamforming solution based on the set of resources, the range of direction, and the first AoD. Then the first device 110 transmits the first reference signals based on the beamforming solution.

In some embodiments, the second device 120 may transmit second reference signals to the third device 130. The second reference signals are for transmit beam training.

With the solution of FIG. 10, UE power savings can be achieved due to decreased SRS overhead for beam sweeping. Further, positioning accuracy can be improved through appropriately beamformed SRS transmissions.

Figure 11:
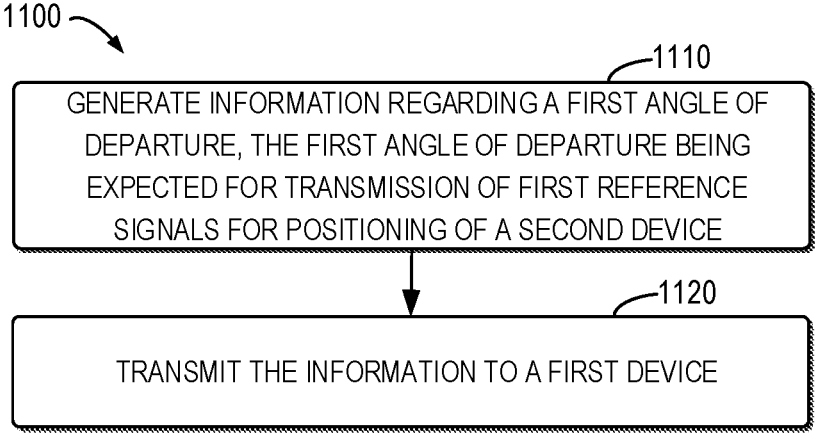
FIG. 11 illustrates a flowchart of an example method of communication for UL positioning implemented at a location management device according to example embodiments of the present disclosure.

FIG. 11 illustrates a flowchart of a method 1100 of communication for UL positioning implemented at a location management device according to example embodiments of the present disclosure. The method 1100 can be implemented at the location management device 140 shown in FIG. 1. For the purpose of discussion, the method 900 will be described with reference to FIG. 1. It is to be understood that method 900 may further include additional blocks not shown and/or omit some shown blocks, and the scope of the present disclosure is not limited in this regard.

As shown in FIG. 11, at block 1110, the location management device 140 generates information regarding a first AoD, the first AoD being expected for transmission of first reference signals to the third device 130. In some embodiments, the location management device 140 may generate the information by determining an estimated location of the second device 120 and determining the first AoD based on the estimated location and locations of the third device 130.

In some embodiments, the location management device 140 may determine the estimated location by determining the estimated location based on at least one of the following: a past location of the second device, or a coverage area of a serving cell of the second device. In some embodiments, the location management device 140 may determine the estimated location by transmitting, to the first device 110, a request for positioning the second device 120; and receiving, from the first device 110, the estimated location of the second device 120.

In some embodiments, the location management device 140 may generate the information by determining the first AoD based on past measurements received from the third device 130 for positioning the second device 120. In some embodiments, the location management device 140 may determine the first AoD based on at least one of measurements for an AoA or measurements for RSRP.

In some embodiments, the location management device 140 may transmit the information regarding the first AoD to the second device 120.

At block 1120, the location management device 140 transmits the information to the first device 110. In this way, an expected AoD can be indicated for facilitating a determination of transmit beamforming or beam sweeping at the second device 120. UE power savings can be achieved due to decreased SRS overhead for beam sweeping.

Further, positioning accuracy can be improved through appropriately beamformed SRS transmissions.

Corresponding to the process described in connection with FIGS. 7 to 8, embodiments of the present disclosure provide methods of communication implemented at a third device, at a second device, and at a location management device. These methods will be described below with reference to FIGS. 12 to 14.

Figure 12:
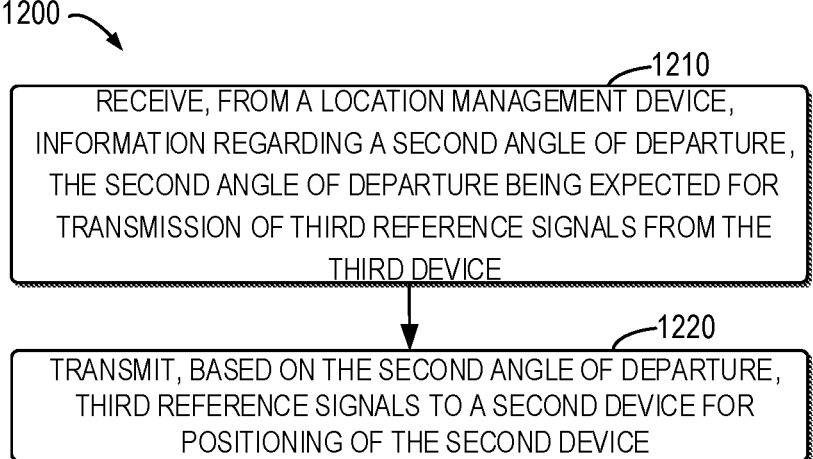
FIG. 12 illustrates a flowchart of an example method of communication for DL positioning implemented at a third device according to example embodiments of the present disclosure.

FIG. 12 illustrates a flowchart of a method 1200 of communication for DL positioning implemented at a third device according to example embodiments of the present disclosure. The method 1200 can be implemented at the third device 130 shown in FIG. 1. For the purpose of discussion, the method 1200 will be described with reference to FIG. 1. It is to be understood that method 1200 may further include additional blocks not shown and/or omit some shown blocks, and the scope of the present disclosure is not limited in this regard.

As shown in FIG. 12, at block 1210, the third device 130 receives, from the location management device 140, information regarding a second AoD, the second AoD being expected for transmission of third reference signals to the second device 120 for positioning a second device.

At block 1220, the third device 130 transmits, based on the second AoD, the third reference signals to the second device 120 for positioning of the second device 120. In this way, determination of transmit beamforming at the third device 130 can be facilitated.

Figure 13:
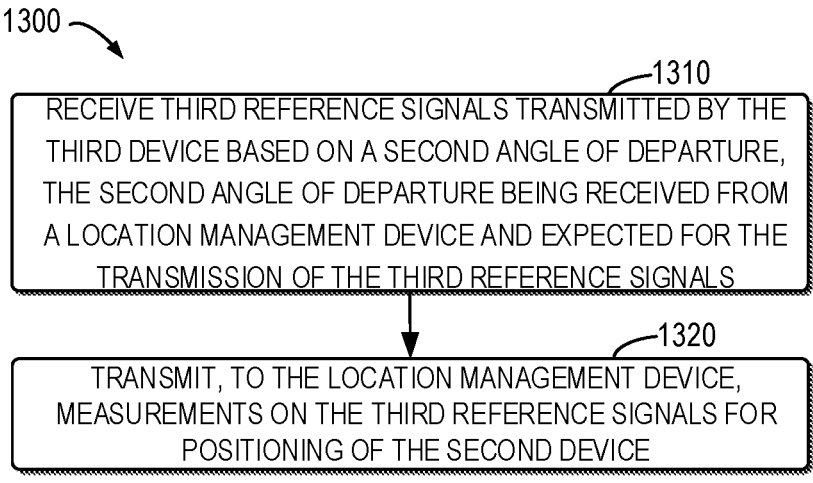
FIG. 13 illustrates a flowchart of an example method of communication for DL positioning implemented at a second device according to example embodiments of the present disclosure.

FIG. 13 illustrates a flowchart of a method 1300 of communication for DL positioning implemented at a second device according to example embodiments of the present disclosure. The method 1300 can be implemented at the second device 120 shown in FIG. 1. For the purpose of discussion, the method 1300 will be described with reference to FIG. 1. It is to be understood that method 1300 may further include additional blocks not shown and/or omit some shown blocks, and the scope of the present disclosure is not limited in this regard.

As shown in FIG. 13, at block 1310, the second device 120 receives, from the third device 130, third reference signals transmitted by the third device 130 based on a second AoD, the second AoD being received from the location management device 140 and expected for the transmission of the third reference signals.

At block 1320, the second device 120 transmits, to the location management device 140, measurements on the third reference signals for positioning of the second device 120.

Figure 14:
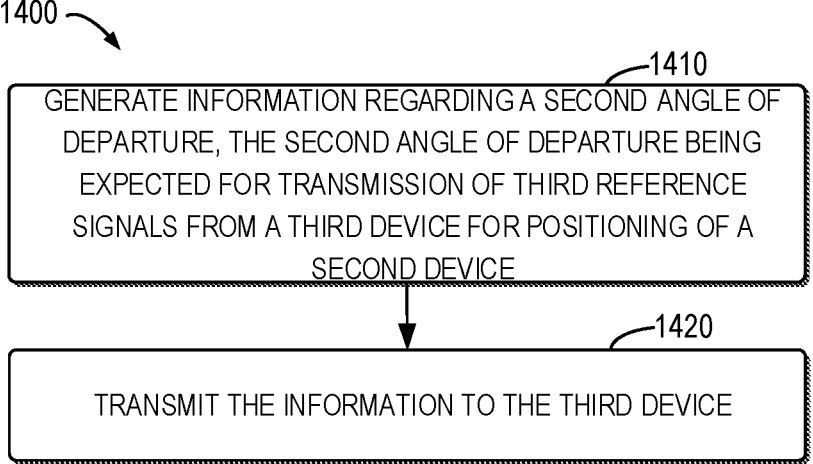
FIG. 14 illustrates a flowchart of an example method of communication for DL positioning implemented at a location management device according to example embodiments of the present disclosure.

FIG. 14 illustrates a flowchart of a method 1400 of communication for DL positioning implemented at a location management device according to example embodiments of the present disclosure. The method 1400 can be implemented at the location management device 140 shown in FIG. 1. For the purpose of discussion, the method 1400 will be described with reference to FIG. 1. It is to be understood that method 1400 may further include additional blocks not shown and/or omit some shown blocks, and the scope of the present disclosure is not limited in this regard.

As shown in FIG. 14, at block 1410, the location management device 140 generates information regarding a second AoD, the second AoD being expected for transmission of third reference signals from the third device 130. In some embodiments, the location management device 140 may generate the information by determining an estimated location of the second device 120 and determining the second AoD based on the estimated location and locations of the third device 130.

In some embodiments, the location management device 140 may determine the estimated location based on at least one of the following: a past location of the second device 120, or a coverage area of a serving cell of the second device 120. In some embodiments, the location management device 140 may determine the estimated location by transmitting, to the first device 110, a request for positioning the second device 120; and receiving, from the first device 110, the estimated location of the second device 120.

In some embodiments, the location management device 140 may generate the information by determining the second AoD based on past measurements received from the second device 120. In some embodiments, the location management device 140 may determine the AoD based on at least one of measurements for an AoA or measurements for RSRP.

At block 1420, the location management device 140 transmits the information to the third device 130. In this way, an expected AoD can be indicated for facilitating a determination of transmit beamforming at the third device 130. Positioning accuracy can be improved through appropriately beamformed RS transmissions.

Example Implementation of Apparatus and Devices

In some embodiments, an apparatus capable of performing any of the method 900 (for example, the first device 110) may comprise means for performing the respective steps of the method 900. The means may be implemented in any suitable form. For example, the means may be implemented in a circuitry or software module.

In some embodiments, the apparatus comprises means for receiving, at a first device and from a location management device, information regarding a first angle of departure, the first angle of departure being expected for transmission of first reference signals to a third device for positioning a second device; means for determining, based on the information, a configuration for the transmission of the first reference signals; and means for transmitting the configuration to the second device.

In some embodiments, the apparatus may further comprise: means for receiving, from the location management device, a request for positioning the second device; means for determining an estimated location of the second device; and means for transmitting the estimated location to the location management device. In some embodiments, the means of determining the estimated location comprises: means for determining an angle range in which the second device is located; means for determining a distance range to the second device; and means for determining the estimated location of the second device based on the angle range and the distance range.

In some embodiments, the means of determining the angle range comprises means for determining an angle of arrival for second reference signals transmitted from the second device. In some embodiments, the means of determining the distance range comprises means for determining the distance range based on at least one of a receive signal strength indication, reference signal receive power, a timing advance or a time of arrival for second reference signals transmitted from the second device.

In some embodiments, the means for determining the configuration comprises means for determining, based on the first angle of departure and a capability of the second device, a set of resources for the transmission of the first reference signals.

In some embodiments, the means for determining the configuration comprises means for determining, based on the first angle of departure, a range of direction for the transmission of the first reference signals. In some embodiments, the means for determining the range of direction comprises: means for determining a reference direction and angle offsets with respect to the reference direction.

In some embodiments, an apparatus capable of performing any of the method 1000 (for example, the second device 120) may comprise means for performing the respective steps of the method 1000. The means may be implemented in any suitable form. For example, the means may be implemented in a circuitry or software module.

In some embodiments, the apparatus comprises means for receiving, at a second device and from a first device, a configuration for transmission of first reference signals, the configuration being determined by the first device based on information regarding a first angle of departure from a location management device, the first angle of departure being expected for the transmission of the first reference signals to a third device for positioning the second device; and means for transmitting, based on the configuration, the first reference signals to the third device.

In some embodiments, the apparatus may further comprise means for transmitting second reference signals to the third device. In some embodiments, the means for receiving the configuration may comprise: means for receiving a set of resources for the transmission of the first reference signals, the set of resources being determined by the first device based on the first angle of departure and a capability of the second device.

In some embodiments, the means for receiving the configuration may further comprises means for receiving a range of direction expected for the transmission of the first reference signals, the range of direction being determined by the first device based on the first angle of departure, and wherein the means for transmitting the first reference signals comprises: means for determining, based on the set of resources and the range of direction, a beamforming solution for the transmission of the first reference signals; and means for transmitting the first reference signals based on the beamforming solution. In some embodiments, the means for receiving the range of direction may comprise means for receiving a reference direction and angle offsets with respect to the reference direction.

In some embodiments, the means for transmitting the first reference signals may comprise: means for receiving, from the location management device, the information regarding the first angle of departure; means for determining, based on the configuration and the information, a beamforming solution for the transmission of the first reference signals; and means for transmitting the first reference signals based on the beamforming solution.

In some embodiments, an apparatus capable of performing any of the method 1100 (for example, the location management device 140) may comprise means for performing the respective steps of the method 1100. The means may be implemented in any suitable form. For example, the means may be implemented in a circuitry or software module.

In some embodiments, the apparatus comprises means for generating, at a location management device, information regarding a first angle of departure, the first angle of departure being expected for transmission of first reference signals to a third device for positioning of a second device; and means for transmitting the information to a first device.

In some embodiments, the means for generating the information may comprise: means for determining an estimated location of the second device; and means for determining the first angle of departure based on the estimated location and a location of a third device for positioning the second device.

In some embodiments, the means for determining the estimated location may comprise means for determining the estimated location based on at least one of the following: a past location of the second device, or a coverage area of a serving cell of the second device.

In some embodiments, the means for determining the estimated location may comprise: means for transmitting, to the first device, a request for positioning the second device; and means for receiving, from the first device, the estimated location of the second device.

In some embodiments, the means for generating the information may comprise means for determining the first angle of departure based on past measurements received from the third device for positioning the second device. In some embodiments, the means for determining the first angle of departure may comprise means for determining the first angle of departure based on at least one of measurements for an angle of arrival or measurements for reference signal receive power.

In some embodiments, the apparatus may further comprise means for transmitting, to the second device, the information regarding the first angle of departure.

In some embodiments, an apparatus capable of performing any of the method 1200 (for example, the third device 130) may comprise means for performing the respective steps of the method 1200. The means may be implemented in any suitable form. For example, the means may be implemented in a circuitry or software module.

In some embodiments, the apparatus comprises means for receiving, at a third device and from a location management device, information regarding a second angle of departure, the second angle of departure being expected for transmission of third reference signals to a second device for positioning a second device; means for transmitting, based on the second angle of departure, the third reference signals to the second device.

In some embodiments, an apparatus capable of performing any of the method 1300 (for example, the second device 120) may comprise means for performing the respective steps of the method 1300. The means may be implemented in any suitable form. For example, the means may be implemented in a circuitry or software module.

In some embodiments, the apparatus comprises means for receiving, at a second device and from a third device, third reference signals transmitted by the third device based on a second angle of departure, the second angle of departure being received from a location management device and expected for the transmission of the third reference signals; and means for transmitting, to the location management device, measurements on the third reference signals for positioning of the second device.

In some embodiments, an apparatus capable of performing any of the method 1400 (for example, the location management device 140) may comprise means for performing the respective steps of the method 1400. The means may be implemented in any suitable form. For example, the means may be implemented in a circuitry or software module.

In some embodiments, the apparatus comprises means for generating, at a location management device, information regarding a second angle of departure, the second angle of departure being expected for transmission of third reference signals to a second device for positioning of a second device; and means for transmitting the information to a third device.

In some embodiments, the means for generating the information may comprise: means for determining an estimated location of the second device; and means for determining the second angle of departure based on the estimated location and locations of the third device.

In some embodiments, the means for determining the estimated location may comprise means for determining the estimated location based on at least one of the following: a past location of the second device, or a coverage area of a serving cell of the second device.

In some embodiments, the means for determining the estimated location may comprise: means for transmitting, to a first device serving the second device, a request for positioning the second device; and means for receiving, from the first device, the estimated location of the second device.

In some embodiments, the means for generating the information may comprise means for determining the second angle of departure based on past measurements received from the second device for positioning the second device. In some embodiments, the means for determining the second angle of departure may comprise means for determining the second angle of departure based on at least one of measurements for an angle of arrival or measurements for reference signal receive power.

Figure 15:
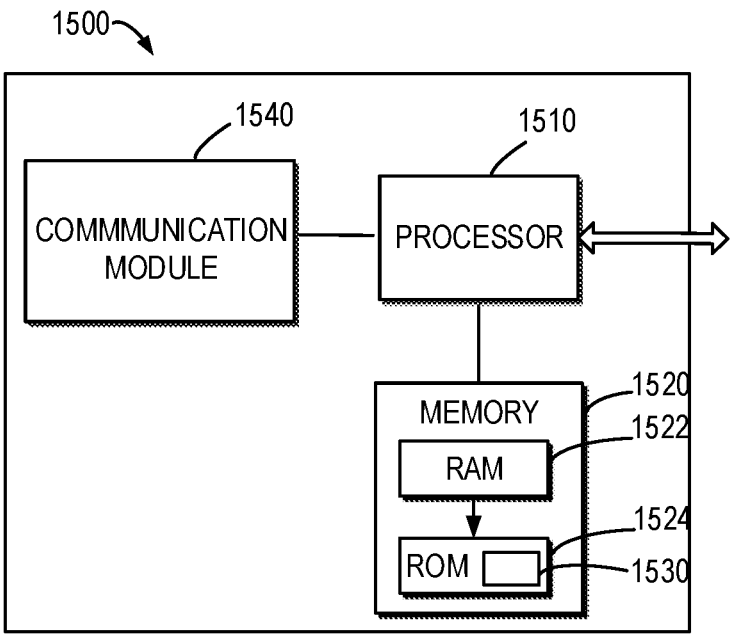
FIG. 15 illustrates a simplified block diagram of an apparatus that is suitable for implementing example embodiments of the present disclosure.

FIG. 15 is a simplified block diagram of a device 1500 that is suitable for implementing embodiments of the present disclosure. The device 1500 may be provided to implement a first device, a second device, a location management device or a third device, for example the first device 110, the second device 120, the location management device 140 or the third device 130 as shown in FIG. 1. As shown, the device 1500 includes one or more processors 1510, one or more memories 1520 coupled to the processor 1510, and one or more communication modules 1540 (such as, transmitters and/or receivers) coupled to the processor 1510.

The communication module 1540 is for bidirectional communications. The communication module 1540 has at least one antenna to facilitate communication. The communication interface may represent any interface that is necessary for communication with other network elements.

The processor 1510 may be of any type suitable to the local technical network and may include one or more of the following: general purpose computers, special purpose computers, microprocessors, digital signal processors (DSPs) and processors based on multicore processor architecture, as non-limiting examples. The device 1500 may have multiple processors, such as an application specific integrated circuit chip that is slaved in time to a clock which synchronizes the main processor.

The memory 1520 may include one or more non-volatile memories and one or more volatile memories. Examples of the non-volatile memories include, but are not limited to, a Read Only Memory (ROM) 1524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1522 and other volatile memories that will not last in the power-down duration.

A computer program 1530 includes computer executable instructions that are executed by the associated processor 1510. The program 1530 may be stored in the ROM 1524. The processor 1510 may perform any suitable actions and processing by loading the program 1530 into the RAM 1522.

The embodiments of the present disclosure may be implemented by means of the program 1530 so that the device

1500 may perform any process of the disclosure as discussed with reference to FIGS. 3 to 14. The embodiments of the present disclosure may also be implemented by hardware or by a combination of software and hardware.

Figure 16:
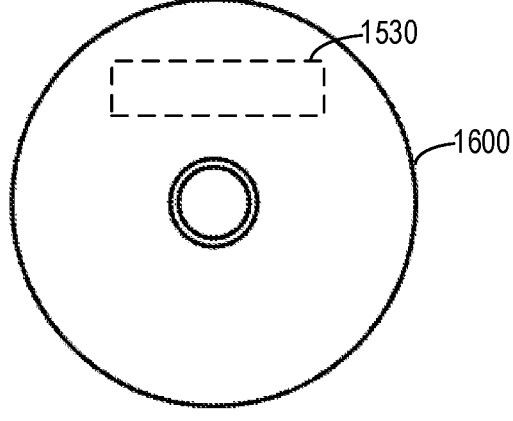
FIG. 16 illustrates a block diagram of an example computer readable medium in accordance with example embodiments of the present disclosure.

In some embodiments, the program 1530 may be tangibly contained in a computer readable medium which may be included in the device 1500 (such as in the memory 1520) or other storage devices that are accessible by the device 1500. The device 1500 may load the program 1530 from the computer readable medium to the RAM 1522 for execution. The computer readable medium may include any types of tangible non-volatile storage, such as ROM, EPROM, a flash memory, a hard disk, CD, DVD, and the like. FIG. 16 shows an example of the computer readable medium 1600 in form of CD or DVD. The computer readable medium has the program 1530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 900 to 1400 as described above with reference to FIGS. 9 to 14. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program code,
the at least one memory and the computer program code configured to, with the at least one processor, cause the first device to:
receive, from a location management device, information regarding a first angle of departure, the first angle of departure being expected for transmission of first reference signals from a second device;
determine, based on the information, a configuration for the transmission of the first reference signals; and
transmit the configuration to the second device.

2. The first device of claim 1, wherein the first device is further caused to:
receive, from the location management device, a request for positioning the second device;
determine an estimated location of the second device; and
transmit the estimated location to the location management device.

3. The first device of claim 2, wherein the first device is caused to determine the estimated location of the second device by:
determining an angle range in which the second device is located;
determining a distance range to the second device; and
determining the estimated location of the second device based on the angle range and the distance range.

4. The first device of claim 3, wherein the first device is caused to determine the angle range by:
determining an angle of arrival for second reference signals transmitted from the second device.

5. The first device of claim 3, wherein the first device is caused to determine the distance range by:
determining the distance range based on at least one of a receive signal strength indication, reference signal receive power, a timing advance or a time of arrival for second reference signals transmitted from the second device.

6. The first device of claim 1, wherein the first device is caused to determine the configuration by:
determining, based on the first angle of departure and a capability of the second device, a set of resources for the transmission of the first reference signals.

7. The first device of claim 6, wherein the first device is further caused to determine the configuration by:
determining, based on the first angle of departure, a range of direction for the transmission of the first reference signals.

8. The first device of claim 7, wherein the first device is caused to determine the range of direction by:
determining a reference direction and angle offsets with respect to the reference direction.

9. The first device of claim 1, wherein the first device is a network device, the second device is a terminal device, and the location management device is a network element having a location management function.

10. A second device comprising:
at least one processor; and
at least one memory including computer program code;
the at least one memory and the computer program code configured to, with the at least one processor, cause the second device to:
receive, from a first device, a configuration for transmission of first reference signals, the configuration being determined by the first device based on information regarding a first angle of departure from a location management device, the first angle of departure being expected for the transmission of the first reference signals from the second device; and
transmit, based on the configuration, the first reference signals for positioning of the second device.

11. A location management device comprising:
at least one processor; and
at least one memory including computer program code,
the at least one memory and the computer program code configured to, with the at least one processor, cause the location management device to:
determining an estimated location of a second device; and
determining a first angle of departure based on the estimated location and a location of a third device for positioning the second device;
generate information regarding the first angle of departure, the first angle of departure being expected for transmission of first reference signals from the second device; and
transmit the information to a first device.

12. The location management device of claim 11, wherein the location management device is caused to determine the estimated location by:
determining the estimated location based on at least one of the following:
a past location of the second device, or
a coverage area of a serving cell of the second device.

13. The location management device of claim 11, wherein the location management device is caused to determine the estimated location by:

transmitting, to the first device, a request for positioning the second device; and receiving, from the first device, the estimated location of the second device.

14. The location management device of claim 11, wherein the location management device is caused to generate the information by:

determining the first angle of departure based on past measurements received from a third device for positioning the second device.

15. The location management device of claim 14, wherein the location management device is caused to determine the first angle of departure by:

determining the first angle of departure based on at least one of measurements for an angle of arrival or measurements for reference signal receive power.

16. The location management device of claim 11, wherein the location management device is further caused to:

transmit the information regarding the first angle of departure to the second device.

17. The location management device of claim 11, wherein the first device is a network device, the second device is a terminal device, and the location management device is a network element having a location management function.

18. A method of communication, comprising:

at a location management device:

determining an estimated location of a second device;

determining a first angle of departure based on the estimated location and a location of a third device for positioning the second device;

generating information regarding the first angle of departure, the first angle of departure being expected for transmission of first reference signals from the second device; and transmitting the information to a first device.

* * * * *